(12) United States Patent
Hedayat et al.

(10) Patent No.: US 7,840,670 B2
(45) Date of Patent: *Nov. 23, 2010

(54) APPARATUS AND METHOD FOR PASSIVELY ANALYZING A DATA PACKET DELIVERY PATH

(75) Inventors: Kaynam Hedayat, Chestnut Hill, MA (US); Daniel S. Pyrik, Lowell, MA (US)

(73) Assignee: EXFO Service Assurance, Inc., Chelmsford, MA (US)

( * ) Notice: Subject to any disclaimer, the term of this patent is extended or adjusted under 35 U.S.C. 154(b) by 34 days.

This patent is subject to a terminal disclaimer.

(21) Appl. No.: 12/259,914

(22) Filed: Oct. 28, 2008

(65) Prior Publication Data

US 2009/0086645 A1 Apr. 2, 2009

Related U.S. Application Data

(63) Continuation of application No. 10/337,653, filed on Jan. 7, 2003, now Pat. No. 7,454,494.

(51) Int. Cl.
*G06F 15/173* (2006.01)
*G06F 11/00* (2006.01)

(52) U.S. Cl. .................. 709/224; 709/223; 370/243; 370/244

(58) Field of Classification Search ......... 370/241–253; 709/223–226; 455/423, 67.11, 115.1, 115.2, 455/226.1; 714/5, 25
See application file for complete search history.

(56) References Cited

U.S. PATENT DOCUMENTS

| | | | |
|---|---|---|---|
| 4,380,029 A | 4/1983 | Bode | 360/48 |
| 4,569,042 A | 2/1986 | Larson | 370/13 |
| 5,271,000 A | 12/1993 | Engbersen et al. | 370/244 |
| 5,309,428 A | 5/1994 | Copley et al. | 370/17 |
| 5,315,580 A | 5/1994 | Phaal | 370/13 |
| 5,337,308 A | 8/1994 | Fan | 370/60 |
| 5,539,659 A | 7/1996 | McKee et al. | 364/514 |
| 5,615,262 A | 3/1997 | Gut et al. | 380/4 |
| 5,627,766 A | 5/1997 | Beaven | 702/122 |
| 5,675,741 A | 10/1997 | Aggarwal et al. | 709/242 |
| 5,822,317 A | 10/1998 | Shibata | 370/474 |
| 5,892,924 A | 4/1999 | Lyon et al. | 395/200.75 |
| 5,923,902 A | 7/1999 | Inagaki | 395/878 |
| 5,953,483 A | 9/1999 | Van Gestel et al. | 386/65 |
| 5,966,387 A | 10/1999 | Cloutier | 370/516 |
| 6,006,270 A | 12/1999 | Kobunaya | 709/233 |
| 6,104,729 A | 8/2000 | Hellum et al. | 370/503 |
| 6,445,681 B1 | 9/2002 | Pogrebinsky | 370/252 |
| 6,480,898 B1 | 11/2002 | Scott et al. | 709/238 |
| 6,515,967 B1 | 2/2003 | Wei et al. | 370/244 |
| 6,621,800 B1 | 9/2003 | Klein | 370/282 |

(Continued)

*Primary Examiner*—Joseph Thomas
*Assistant Examiner*—Brendan Higa
(74) *Attorney, Agent, or Firm*—Pierce Atwood LLP; Joseph M. Maraia; Christopher E. Everett

(57) ABSTRACT

A packet transmission diagnostic system transmits diagnostic packets during a communications session in which data packets are transmitted between a source and destination. The diagnostic packets elicit responses from routers along a path between the source and destination. The elicited responses, in the form of packets, are used by the diagnostic system to produce one or more packet-delivery metrics for one or more of the routers along a packet transmission path between the source and destination.

20 Claims, 10 Drawing Sheets

U.S. PATENT DOCUMENTS

| | | | |
|---|---|---|---|
| 6,665,317 B1 | 12/2003 | Scott | 370/516 |
| 6,680,955 B1 | 1/2004 | Le | 370/477 |
| 6,721,272 B1 | 4/2004 | Pamafes et al. | 370/235 |
| 6,785,237 B1 | 8/2004 | Sufleta | 370/236 |
| 6,944,673 B2 | 9/2005 | Malan et al. | 709/237 |
| 6,990,124 B1 | 1/2006 | Dalias et al. | 370/522 |
| 7,072,305 B1 | 7/2006 | Gregson | 370/241 |
| 2002/0105911 A1 | 8/2002 | Pruthi et al. | 370/241 |
| 2002/0120727 A1 | 8/2002 | Curley et al. | 709/223 |
| 2002/0193999 A1* | 12/2002 | Keane et al. | 704/270 |
| 2003/0031126 A1 | 2/2003 | Mayweather et al. | 370/223 |
| 2003/0046388 A1 | 3/2003 | Milliken | 709/224 |
| 2003/0086425 A1 | 5/2003 | Bearden et al. | 370/392 |
| 2003/0093513 A1 | 5/2003 | Hicks et al. | 709/224 |
| 2003/0115321 A1* | 6/2003 | Edmison et al. | 709/224 |
| 2003/0198235 A1* | 10/2003 | Weldon et al. | 370/401 |
| 2003/0227878 A1 | 12/2003 | Krumm-Heller et al. | 370/254 |
| 2004/0073641 A1 | 4/2004 | Minhazuddin et al. | 709/223 |
| 2004/0073690 A1* | 4/2004 | Hepworth et al. | 709/230 |
| 2005/0123003 A1 | 6/2005 | Bordonaro et al. | 370/516 |
| 2006/0007871 A1 | 1/2006 | Welin | 370/252 |

\* cited by examiner

APPARATUS AND METHOD FOR PASSIVELY ANALYZING A DATA PACKET DELIVERY PATH

CROSS-REFERENCE TO RELATED APPLICATIONS

This application is a continuation of application Ser. No. 10/337,653, filed on Jan. 7, 2003, entitled and which is hereby incorporated by reference. This application is related to an application entitled, APPARATUS AND METHOD FOR PASSIVELY ANALYZING A DATA PACKET DELIVERY PATH, application Ser. No. 10/337,560 having the same inventors, assigned to the same assignee, filed on Jan. 7, 2003, and hereby incorporated by reference.

STATEMENT REGARDING FEDERALLY SPONSORED RESEARCH

Not Applicable

REFERENCE TO MICROFICHE APPENDIX

Not Applicable

BACKGROUND

The present invention relates to packetized data networks, and more particularly, to characterizing one or more hops along a path traversed by a packet as it travels from a source to a destination.

Packet communications systems were originally designed to deliver packets of data that could be fragmented at a source and re-assembled at a destination with little concern for the delays and randomization of packets associated with the traversal of various paths from source to destination. That is, a packet system accepts data packets from a source and sends individual packets that are a part of a larger message through a network of routers. Each packet may take any one of several paths available through the network of routers. The packets may therefore arrive out of sequence, with different delays attributable to the different paths taken. Delivery of the information contained in an email, for example, is not sensitive to the normal delays or disordering of packets associated with such a delivery system.

However, some types of data are more sensitive to delays. Voice data, for example, is very sensitive to loss, latency, and jitter. One way to maximize quality of service and to thereby provide adequate performance for time-critical data, such as voice data, is by policy-based routing. In a policy-based routing scheme, certain packet-types are given higher priority and, therefore, are more likely to traverse the router network without undue latency, loss, or jitter.

Regardless of whether a communications system employs policy-based routing, diagnostic systems are required to determine the overall performance of the network and, in the case of a failure, to locate individual components, such as routers, that have failed. One approach to such network diagnoses is to use a scheme commonly referred to as "Traceroute". Traceroute sends diagnostic packets having successively higher "time to live" (TTL) values to ports, such as high-numbered ports, unlikely to be providing services, at the destination. Each router that receives a packet decrements the TTL value and passes the packet along. Once the packet's TTL value reaches a threshold, a receiving router returns a "time-expired" message to the source. Eventually, when the source sends a packet having a high enough TTL value, the destination will return an error message indicating that services are not available on the high-address port. In this way, traceroute can delineate a path between a source and a destination through a network. However, there are invariably several possible paths through the network from the source to the destination, and there is no reason to believe that, once a communications session has ended, the traceroute diagnostic packets are going to traverse the same path as previously sent data packets. Additionally, firewalls and other security mechanisms recognize and deny access to traceroute packets. Furthermore, traceroute provides no measure of jitter or latency.

A system and method that provides a measure of loss, latency, and jitter, on a per-hop, and/or per path basis, particularly for time-sensitive packet delivery applications such as voice over Internet protocol (VOIP), would be particularly desirable.

SUMMARY OF THE INVENTION

A packet transmission diagnostic system and method in accordance with the principles of the present invention transmits diagnostic packets during a communications session in which data packets are transmitted between a source and destination. The diagnostic packets elicit responses from routers along a path between the source and destination. The elicited responses, in the form of packets, are used by the diagnostic system to produce a packet-delivery metric for one or more of the routers along a packet transmission path between the source and destination. A system in accordance with the principles of the present invention may include a monitor, which may take the form of a controller configured to operate as a monitor, that monitors call signaling information to determine when a data packet communications session is underway. Once the communications session is underway, the diagnostic system may begin transmitting diagnostic packets, interleaving them with data packets being exchanged during the communications session. A system in accordance with the principles of the present invention may include a controller configured to establish a data packet communications session. Once the communications system is underway, the diagnostic system may begin transmitting diagnostic packets, interleaving them with data packets being exchanged during the communications session.

In accordance with the principles of the present invention, each diagnostic packet has the same format as data packets transmitted during the communications session. In an illustrative embodiment this means that each diagnostic packet is the same length as the data packets and each diagnostic packet includes the same user datagram protocol (UDP) destination port number as the data packets. In a real time protocol (RTP) embodiment, each diagnostic packet includes an RTP header that is valid for the type of data being transmitted during the communications session and includes the same differential services code point as the data packets.

Each diagnostic packet elicits a response from a router along a path between the source and destination. In an illustrative embodiment, each diagnostic packet elicits a response that includes a timestamp and the address of the responding router. The diagnostic packet may be a packet that includes information that elicits an error response from routers along the path. For example, in an RTP/IP embodiment, each diagnostic packet may include in its header a time to live (TTL) value that generates an error response packet from a router along the path. By varying the TTL value, such error response packets may be elicited from each router along the path. By transmitting diagnostic packets that elicit a plurality of responses from an individual router, the system may compute the jitter attributable to a particular "hop" or router. Latency, loss, and jitter may also be measured by the return (or lack of return) of elicited packets.

Basic diagnostic configurations include: peer-to-peer active, peer-to-peer passive, single point active, and single point passive. In active configurations, a diagnostic element initiates a call for diagnostic purposes. In passive configurations, diagnostic elements monitor ongoing calls and employ them for diagnostic purposes. Peer-to-peer configurations employ diagnostic elements at both the transmitting and receiving ends. Single point configurations employ a diagnostic element at one end of the path. Because diagnostic packets are sent during an established communications session, the number of "hops" (n+1, where n is the number of routers along a path between the source and destination) in a path may be determined from the system's signaling path. In an illustrative peer-to-peer active testing embodiment, diagnostic elements located at either end of a path under test monitor diagnostic packets. In such an embodiment, the transmitting diagnostic element informs the receiving diagnostic element of the diagnostic packet's originating TTL value. The receiving diagnostic element notes the packet's received TTL value, and the difference between the originating and received values yields the number of hops between the transmitting and receiving diagnostic elements. The receiving diagnostic element may communicate this information to the transmitting diagnostic element, thereby eliminating the need for the transmitting diagnostic element to discover the number of hops by incrementing diagnostic packets' TTL values. That is, the diagnostic system therefore need not gradually increase the diagnostic packets' TTL value and need not send the diagnostic packets to a port that is unlikely to be offering services. Additionally, because the diagnostic packets are sent during a communications session and are of the same format as data packets, the packets are undetectable by firewalls and other security mechanisms and may, therefore, reach destinations that conventional diagnostic packets may not be able to reach. Peer-to-peer passive, single point active, and single point passive embodiments would employ the altered (incremented or decremented) TTL value method to determine the number of hops in the path.

BRIEF DESCRIPTION OF DRAWINGS

The foregoing and other objects of this invention, the various features thereof, as well as the invention itself, may be more fully understood from the following description, when read together with the accompanying drawings in which:

The conceptual block diagram of FIGS. 1A through 1E illustrate the major components of a packet communications system that employs a diagnostic method and apparatus in accordance with the principles of the present invention;

Figure 2:
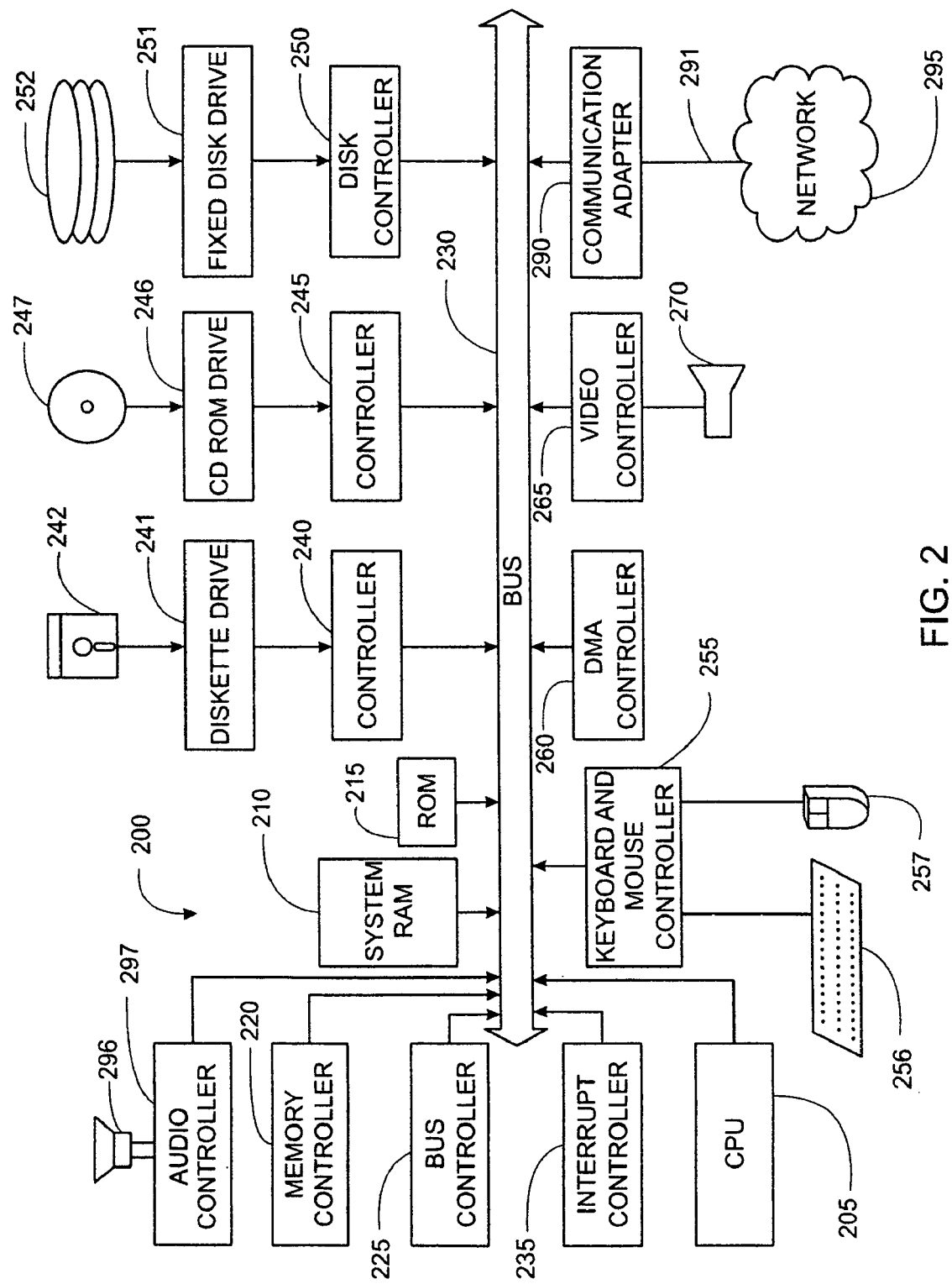
Figure 3:
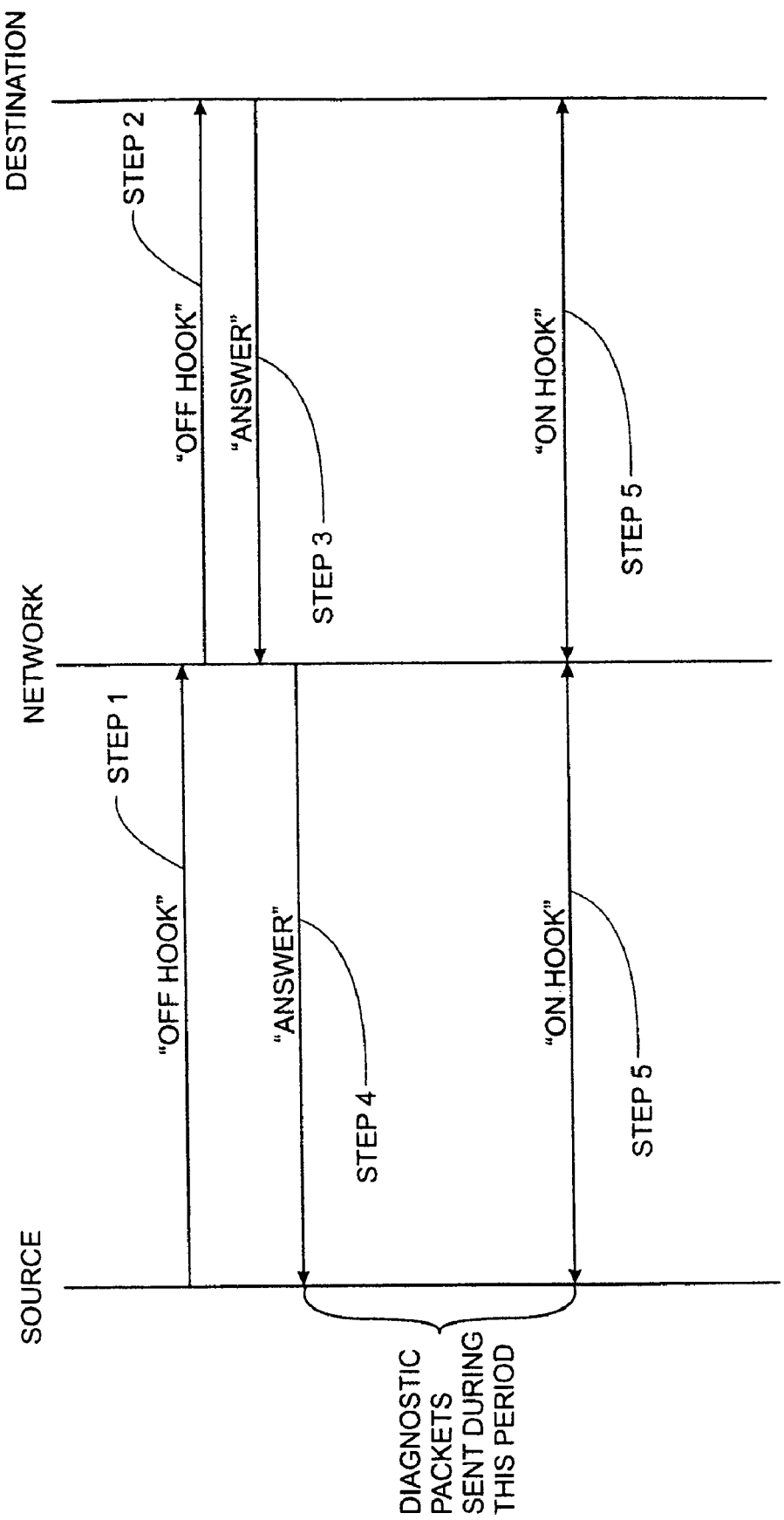
Figure 4:
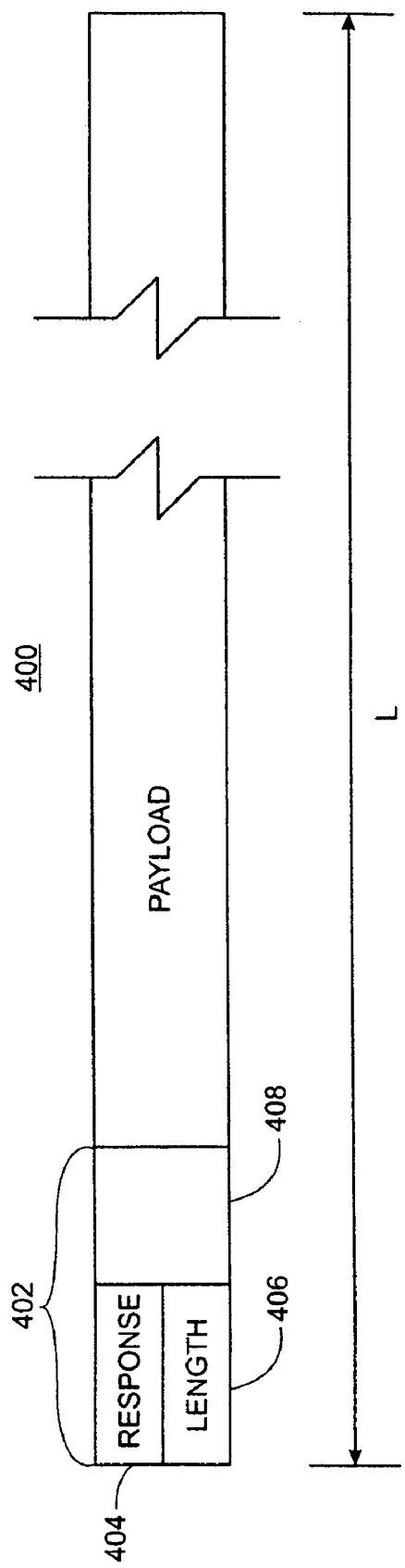
Figure 5A:
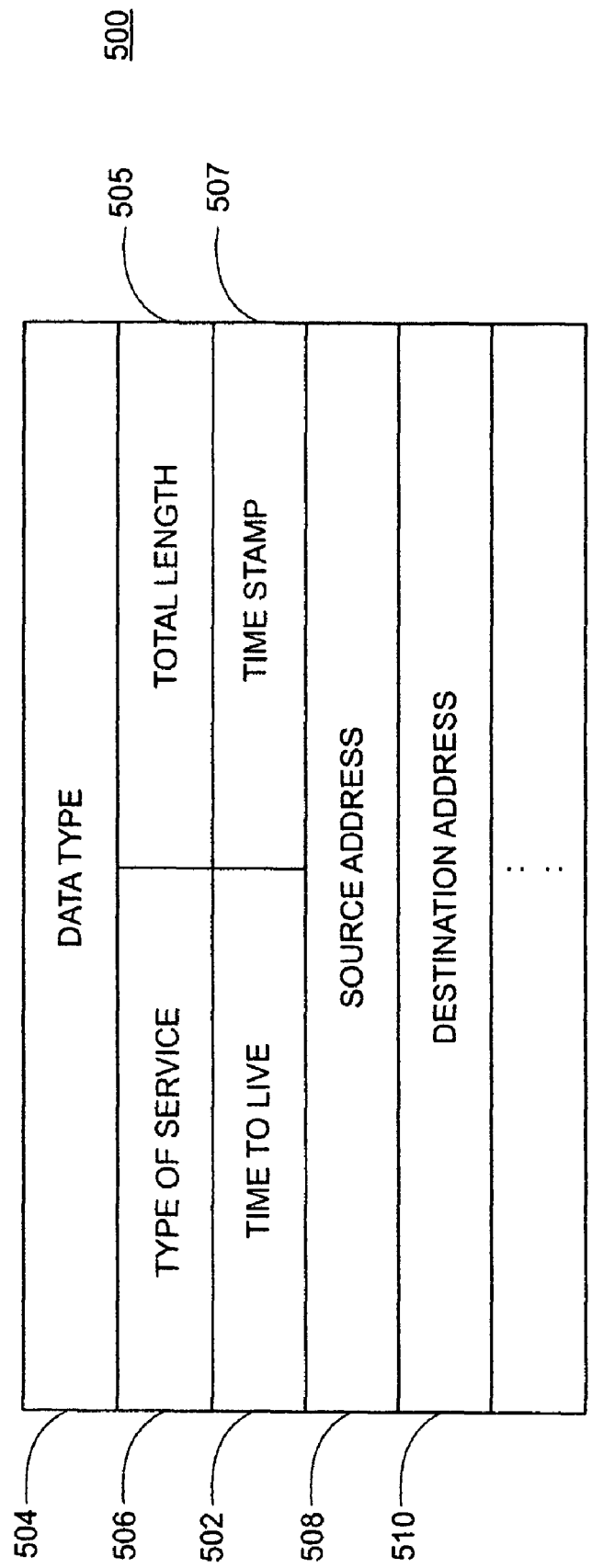
Figure 5B:
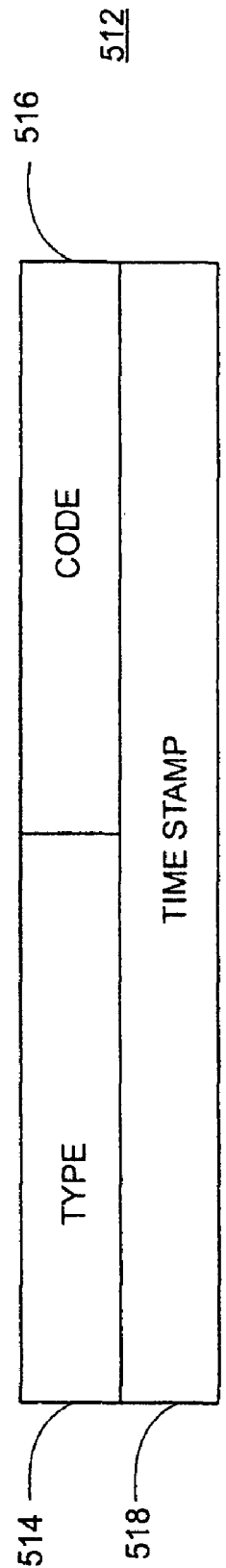
Figure 6:
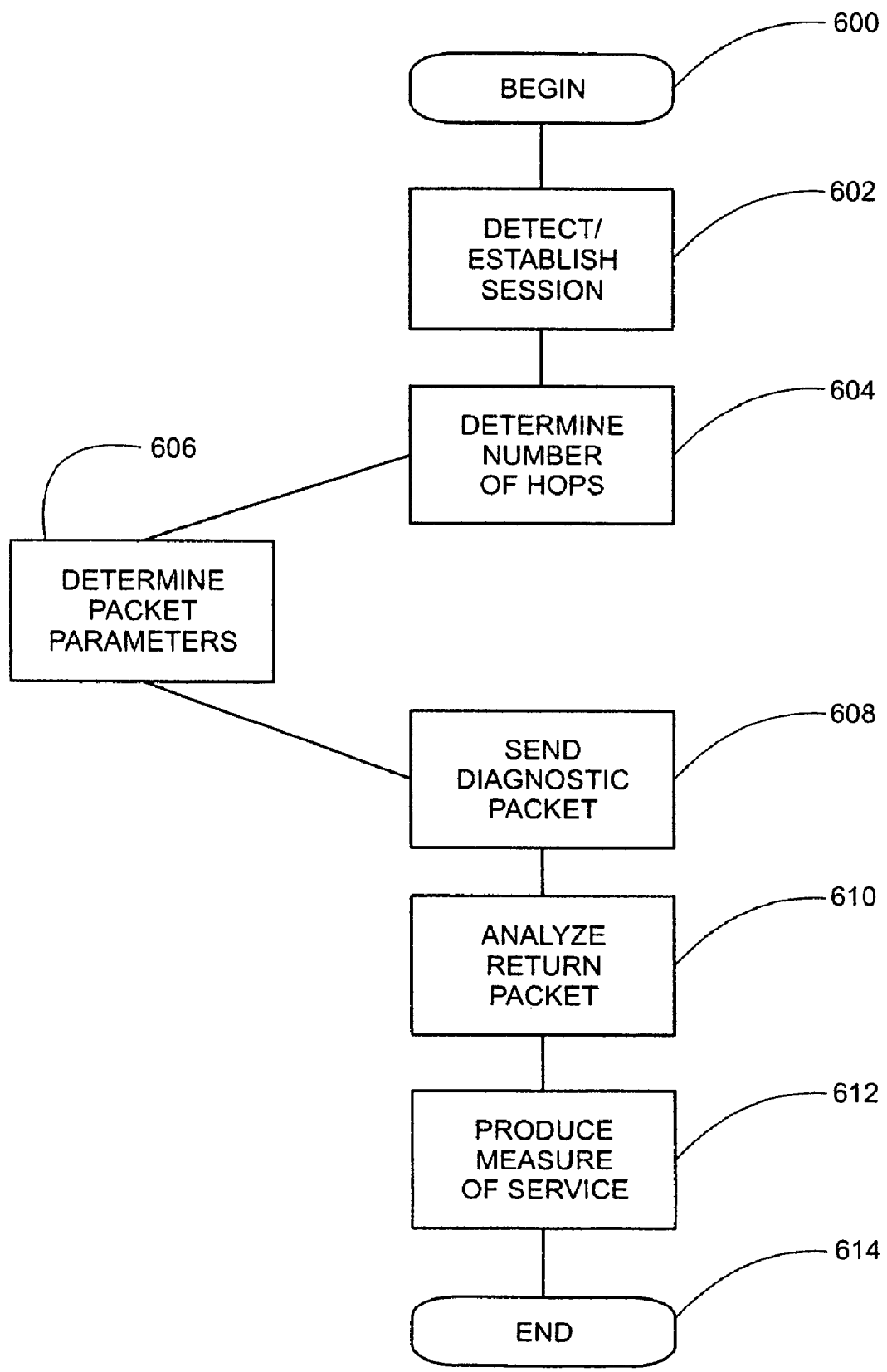

The block diagram of FIG. 2 illustrates the major components of a controller such as may be employed by a diagnostic system in accordance with the principles of the present invention;

The signal flow graph of FIG. 3 illustrates the process of exchanging diagnostic packets during a communications session in accordance with the principles of the present invention;

The block diagram of FIG. 4 illustrates key components of a diagnostic packet such as may be employed by a diagnostic system in accordance with the principles of the present invention;

The block diagram of FIG. 5A illustrates key components of an RTP diagnostic packet such as may be employed by a diagnostic system in accordance with the principles of the present invention;

The block diagram of FIG. 5B illustrates key components of a return packet such as may be elicited by a diagnostic packet in accordance with the principles of the present invention; and The flow chart of FIG. 6 illustrates the process by which a diagnostic system in accordance with the principles of the present invention may evaluate a packet communications system.

DESCRIPTION

The block diagram of FIG. 1 depicts a packet communications system 100 that employs a diagnostic system an method in accordance with the principles of the present invention. A data source 102 communicates with a data destination 104 by sending packets of data through a network of routers 106. In this illustrative example only five routers A, B, C, D, and E, are shown. As is known in the art, there may be hundreds of routers in a network and a packet may traverse dozens of routers on its way from a source to a destination. Routers maintain routing tables that allow them to pass packets from router to router and, eventually, to a destination.

Figure 1A:
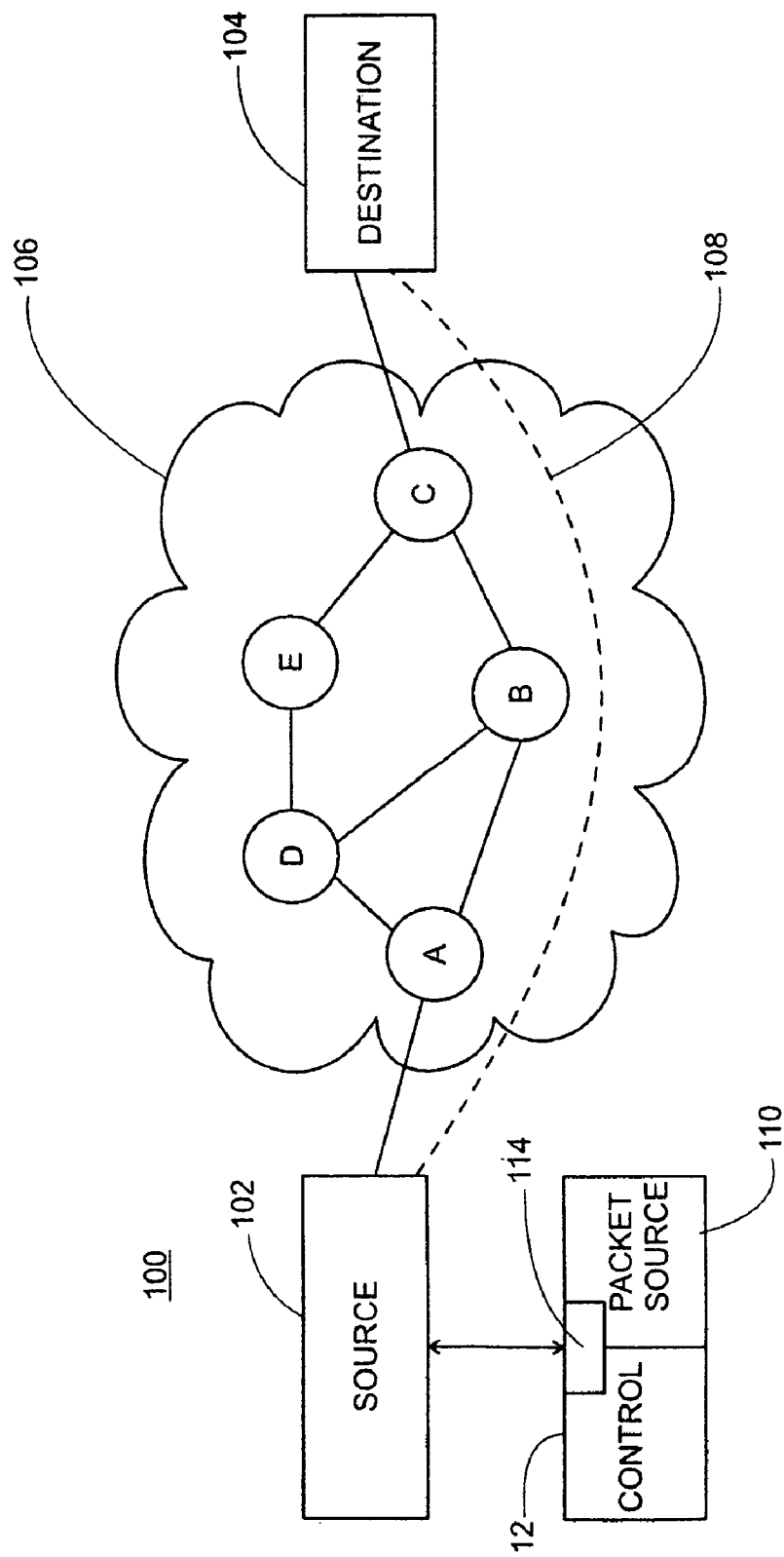

In the illustrative example of FIG. 1A, a packet may travel from the source to the destination through a variety of paths. For example, a packet may travel from the source 102 to the destination 104 through routers A,B, and C; through routers AD,B, and C, or through routers A,D,E, and C. Additionally, a signaling path 108 may wind through a variety of routers, and provides signaling information, such as "Off Hook", "Answer", for example, to source and destination. A diagnostic system 110 in accordance with the present invention may be located at a source 102 (as illustrated) or at other locations throughout the network, including the destination 104, for example. The diagnostic system includes a controller 112 and an interface 114 to the source 102 and network. As will be described in greater detail below, the controller 112 may be configured to operate as a monitor, a packet source, and/or a call establishment mechanism. The interface 114 provides access to the data packet transmission resources and signaling resources of the network. The diagnostic system 110 may be connected, through the interface 114, in series with or in parallel with the source 102. The interface 114 may be through a communications adapter 290 or a bus 230, as described in the discussion related to FIG. 2, for example.

The diagnostic system 110 may operate in a passive manner, detecting the establishment of a communications session, then injecting diagnostic packets into the data stream once the communications session has commenced. The diagnostic packets may be sent at any time during the communications session, that is, for example, before, interleaved with, or after data packets are sent. Alternatively, the diagnostic system 110 may operate in an active mode, employing the signaling path 108 to establish a communications session, then proceeding to send diagnostic packets. In addition to diagnostic packets, in an active mode, the diagnostic system 110 generates and sends data packets having the same characteristics as data packets that would otherwise be transmitted by the source 102 or destination 104. For example, if the source were communicating media packets, such as voice, video, or audio packets, the diagnostic system would generate packets having the same characteristics as those packets and send them during a communication session established by the diagnostic system 110. The diagnostic system would also, after establishing the communications session, transmit diagnostic packets during the communications session. As with the passive operation, the diagnostic system would generate and send diagnostic packets during the communications session, before, interleaved with, or after the data packets. As with the passive mode of operation, the diagnostic packets would exhibit the same characteristics as the data packets.

Figure 1B:
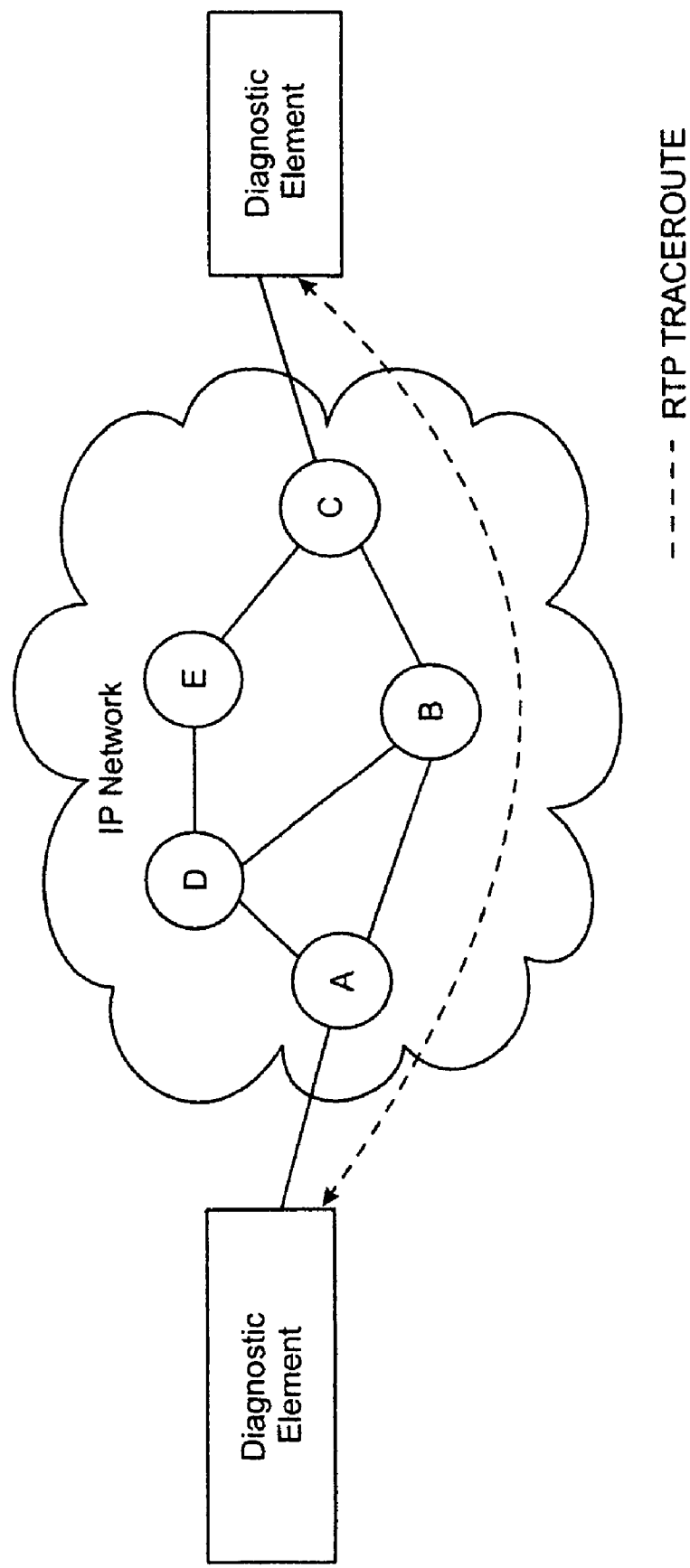
Figure 1C:
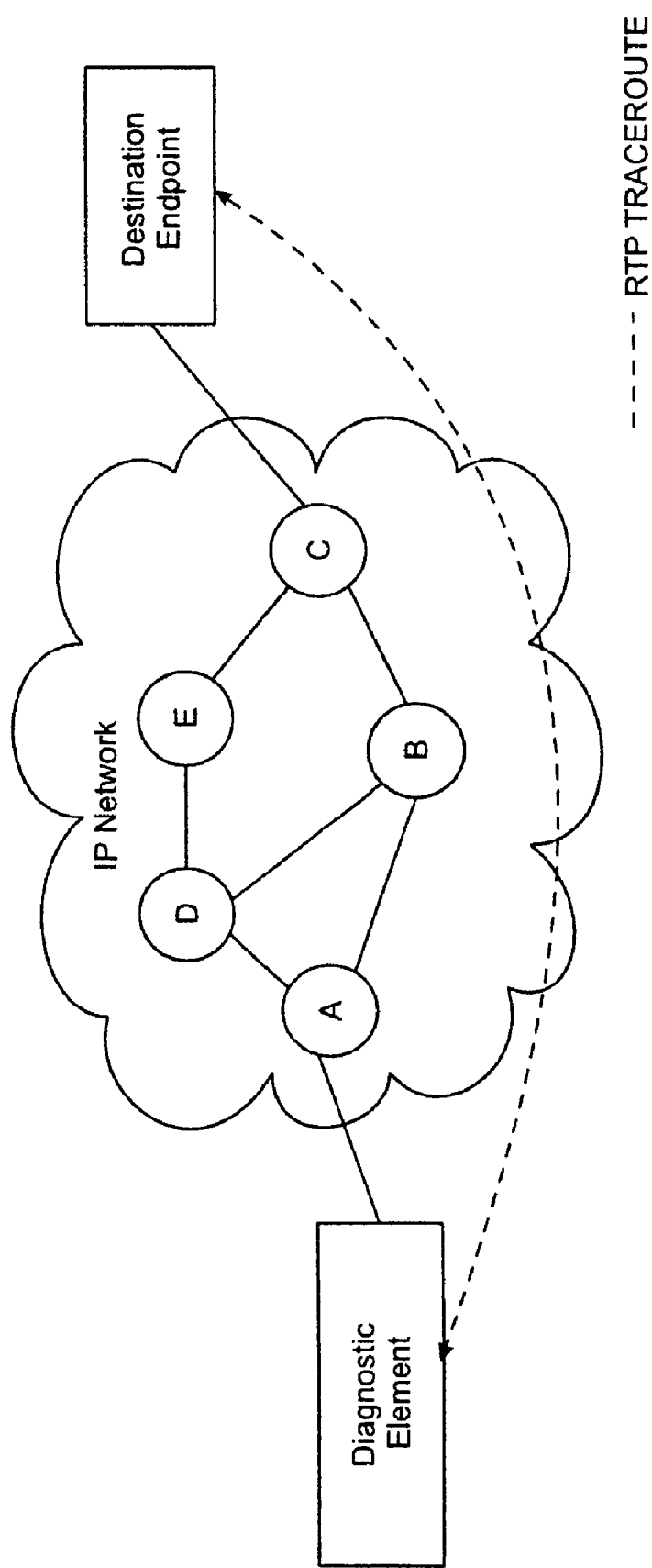
Figure 1D:
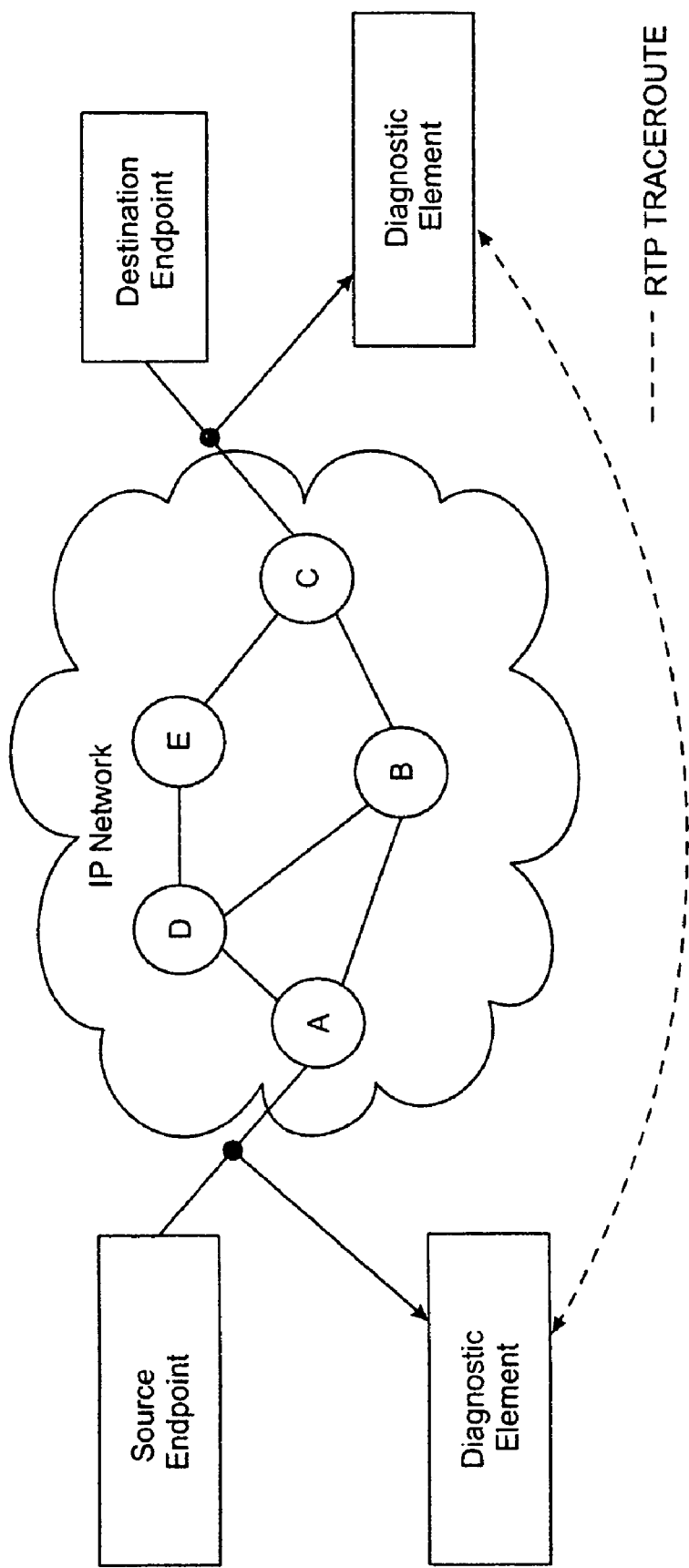
Figure 1E:
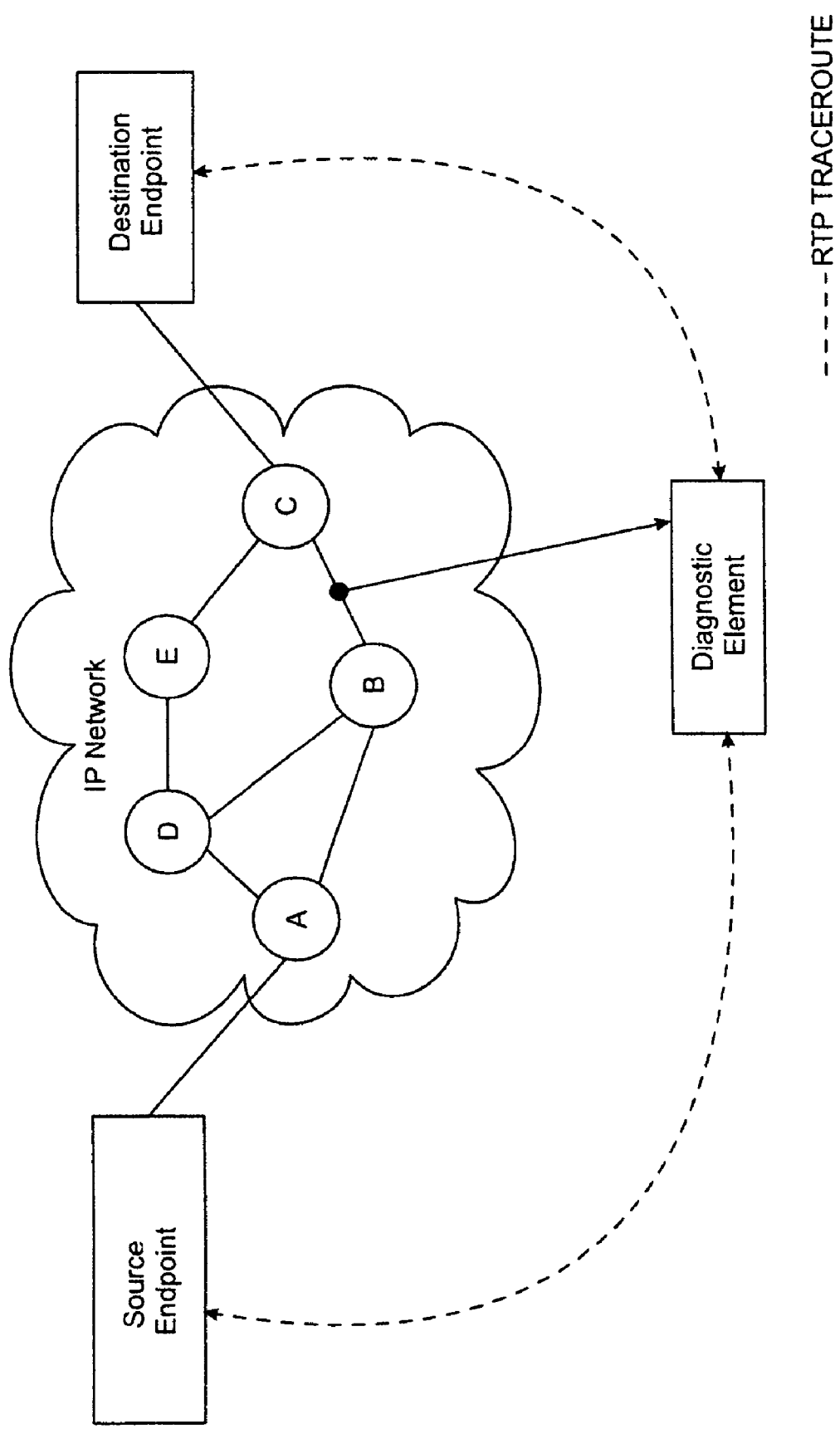

Each diagnostic packet elicits a response from a router along a path between the source 102 and destination 104. The responses elicited by the diagnostic packets are in the form of packets that include time stamps and the address of the router returning the packet. Diagnostic packets may be in the form of packets which cause a router to generate and return an "error packet" that includes the router's address and a time stamp. FIG. 1B depicts a system in which diagnostic elements are arranged in a peer-to-peer active testing configuration. FIG. 1C depicts a system in which a diagnostic element is arranged in a single point active testing mode. FIG. 1D depicts a system in which diagnostic elements are arranged in a peer-to-peer passive testing mode, and FIG. 1E depicts a system in which a diagnostic element is arranged in a single point passive testing mode.

The conceptual block diagram of FIG. 2 illustrates the system architecture for a computer system 200 on which a controller in accordance with the principles of the present invention may be implemented. The exemplary computer system of FIG. 2 is for descriptive purposes only. Although the description may refer to terms commonly used in describing particular computer systems, the description and concepts equally apply to other systems, including systems having architectures dissimilar to FIG. 2.

Computer system 200 includes a central processing unit (CPU) 205, which may be implemented with a conventional microprocessor, a random access memory (RAM) 210 for temporary storage of information, and a read only memory (ROM) 215 for permanent storage of information. A memory controller 220 is provided for controlling RAM 210.

A bus 230 interconnects the components of computer system 200. A bus controller 225 is provided for controlling bus 230. An interrupt controller 235 is used for receiving and processing various interrupt signals from the system components.

Mass storage may be provided by diskette 242, CD ROM 247, or hard drive 252. Data and software may be exchanged with computer system 200 via removable media such as diskette 242 and CD ROM 247. Diskette 242 is insertable into diskette drive 241 which is, in turn, connected to bus 230 by a controller 240. Similarly, CD ROM 247 is insertable into CD ROM drive 246 which is, in turn, connected to bus 230 by controller 245. Hard disc 252 is part of a fixed disc drive 251 which is connected to bus 230 by controller 250.

User input to computer system 200 may be provided by a number of devices. For example, a keyboard 256 and mouse 257 are connected to bus 230 by controller 255. An audio transducer 296, which may act as both a microphone and a speaker, is connected to bus 230 by audio controller 297, as illustrated. It will be obvious to those reasonably skilled in the art that other input devices, such as a pen and/or tabloid may be connected to bus 230 and an appropriate controller and software, as required. DMA controller 260 is provided for performing direct memory access to RAM 210. A visual display is generated by video controller 265 which controls video display 270. Computer system 200 also includes a communications adaptor 290 which allows the system to be interconnected to a local area network (LAN) or a wide area network (WAN), schematically illustrated by bus 291 and network 295. An input interface 299 operates in conjunction with an input device 293 to permit a user to send information, whether command and control, data, or other types of information, to the system 200. The input device and interface may be any of a number of common interface devices, such as a joystick, a touch-pad, a touch-screen, a speech-recognition device, or other known input device. The interface 114 to the network and source 102 may be an interface to the bus 230, to the input interface 299, or combinations thereof, for example.

FIG. 3 provides an overview of the process whereby a communications session is established and diagnostic packets are utilized in accordance with the principles of the present invention. In step 1 the source 102 signals an "off hook" condition to the packet network 106 through the signaling path 108. In step 2 the packet network passes the "off hook" signal to the destination 104. In response to the "off hook" signal from the source 102, in step 3 the destination 104 returns and "Answer" signal through the signaling path 108 to the network 106. In step 4 the "Answer" signal is passed to the source 102, thereby establishing a communications session. Once a connection session has been established in this manner, the source may begin transmitting data packets. A diagnostic system in accordance with the principles of the present invention sends diagnostic packets during a communications session, as defined by the period between the "Answer" of step 4 and the termination of the session by an "on hook" condition established by either the source or destination in step 5.

A diagnostic packet 400, such as may be employed by a diagnostic system in accordance with the principles of the present invention, includes a header 402 that contains components as depicted by the block diagram of FIG. 4. Each header 402 includes a field 404 that elicits a response from at least one router along a communications path from a source to a destination. The elicited responses include a timestamp and the address of the router that returns the response packet. The length of the diagnostic packet, which may be indicated by a header entry 406 is the same as data packets sent during a communications session. Additionally, the data type, as indicated by a header entry 408, is a valid entry for the type of data being transmitted during the communications session.

The block diagram of FIG. 5A illustrates the components of a real time protocol (RTP) diagnostic packet 500 in accordance with the principles of the present invention. In this illustrative embodiment, the diagnostic packet includes a header that includes a time to live (TTL) value 502 that is set to elicit an error response from a router along the path between the source and destination of a communications session. A diagnostic packet source in accordance with the principles of the present invention creates a diagnostic packet having a TTL value that will be decremented as the packet traverses a path between the source and destination. The diagnostic packet source sets the TTL value so that the packet causes a router along the way to respond with a "time expired" error packet. Each time-expired error packet includes a time stamp, and the address of the router sending the error packet. The diagnostic packet 500 is of the same length as data packets being transmitted. A data type field 504 is set to the same value as that of data packets being transmitted during the communications session. The data type may indicate that the data is voice data or video data, for example. The differential services field 506 is also set to the same value as that of the data being transmitted during the communications session. This field may allow policy-based preferential routing, giving higher priority to voice packets than to email packets, for example. The header also includes source 508 and destination 510 addresses. Diagnostic packets are indistinguishable from the regular, in-session, packets.

FIG. 5B is a block diagram that illustrates a response packet elicited by an RTP diagnostic packet in accordance with the principles of the present invention. In this illustrative embodiment, the returned packet is an ICMP packet 512 that includes a type field 514, a code field 516, and a time stamp 518. The type and code fields identify the returned packet as an ICMP "time exceeded" or type 11, error packet. The time stamp may be used by a diagnostic system in accordance with the principles of the present invention to determine latency and jitter during a communications session.

The flow chart of FIG. 6 depicts the process of determining the performance of a packet network in accordance with the principles of the present invention. The process begins in step 600 then proceeds to step 602 where the diagnostic system either establishes or detects the establishment of a communications session between a source and a destination. A controller, such as the controller 212 described in relation to the discussion of FIGS. 1 and 2, may be configured to establish and/or detect such an establishment of a communications session, evidenced by the "Answer" of a destination, as described in the discussion related to FIG. 3. From step 602, the process proceeds to step 604, where the diagnostic system determines the number of routers, or "hops", between the source and destination. As previously described, this information may be obtained from signaling information available through a signaling path, such as the path 108 described in relation to the discussion of FIG. 1 in a peer-to-peer active testing configuration, whereby a transmitting diagnostic element indicates to a receiving diagnostic element an initial TTL value and the receiving diagnostic element determines the number of hops from the difference between the originating and received TTL values.

From step 604 the process proceeds to step 606, where the diagnostic system determines packet parameters, such as packet length and type of service, by examining a data packet that has been transmitted by a source. As described in the discussion of FIG. 4, diagnostic packets produced by the diagnostic system match the length, data type, and differential services value, of the data packets communicated during a session. If the diagnostic system established, rather than detected, the establishment of the communications session, the diagnostic system produces bot the "data" and diagnostic packets and ensures a match between length, data type, and differential services value of the diagnostic and data packets.

From step 606 the process proceeds to step 608 where the diagnostic system sends diagnostic packets that elicit responses from every router along at least one path between the source and destination. In an embodiment in which the source and destination are communicating voice data over Internet protocol, the diagnostic system may employ packets having time to live (TTL) values that prompt routers along the path to return ICMP "time exceeded" error messages. Since the diagnostic system has determined the number of hops along the path between the source and destination in step 604, the diagnostic system may generate and send diagnostic packets having all the TTL values required to elicit responses from all the routers along a communications path in any order. That is, unlike conventional systems, the diagnostic system needn't send packets that address high port numbers, with increasing TTL values, until the destination is reached.

From step 608 the process proceeds to step 610, where the diagnostic system analyzes the returned packets. For example, latency and loss figures may be computed by transmitting a statistically significant number of diagnostic packets and examining the time stamps of returned packets, or, in the case of loss calculations, determining the number of diagnostic packets that don't receive responses. A jitter figure may be associated with each router along the route by analyzing the time stamps of a statistically significant number of packets returned by each router. Loss, latency, and jitter may be computed for each router, as well as for the entire path.

From step 610 the process proceeds to step 612 where a measure of service for each hop and/or for the entire path is developed and reported. The report may be made to a system monitor that can modify the network in order to improve service, for example. From step 612, the process proceeds to end in step 614.

A software implementation of the above described embodiment(s) may comprise a series of computer instructions either fixed on a tangible medium, such as a computer readable media, e.g. diskette, CD-ROM, ROM, or fixed disc, or transmittable to a computer system, via a modem or other interface device, such as communications adapter connected to the network over a medium. Medium can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures, operating systems, or protocols. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be apparent to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results. Processes illustrated through the use of flow charts may not be strictly linear processes and alternative flows may be implemented within the scope of the invention. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. The invention may be embodied in other specific forms without departing from the spirit or essential characteristics thereof It is intended that the scope of the invention be limited only by the claims appended hereto.

What is claimed is:

1. In a packet network communications system, a method of passively analyzing packet-delivery performance during a communications session between a source and destination, the method comprising:

detecting by a call signaling exchange the establishment of a communications session between a source and a destination, the communications session being that period between a call answer signal from the destination and a call termination condition during which data packets are sent between the source and the destination;

sending in response to detecting the establishment of the communications session, diagnostic packets from the source during the established communication session, each packet eliciting a response from a router along a path between the source and destination; and analyzing the responses from routers along at least one path to produce a packet-delivery metric for one or more of the routers along one or more paths between the source and the destination, wherein each diagnostic packet is of the same format as data packets delivered during the communications session, each diagnostic packet is of the same length as data packets being transmitted in the communications session, and each diagnostic packet including: the same user datagram protocol (UDP) destination port number as data packets, the same differential services code point as the data packets, and a real time protocol (RTP) header that is valid for the data being transmitted in the communications session.

2. The method of claim 1 further comprising obtaining information from the destination through out-of-band signaling and using the information to determine the number of routers between the source and destination.

3. The method of claim 2 wherein the out of band signaling returns the time to live (TTL) value of an RTP packet at the destination, the difference between the TTL value at the destination and the TTL value at the source indicating the number of routers along a path from the source to the destination.

4. The method of claim 1 further comprising:

from the analysis of the responses from the routers, identifying one or more routers whose performance is diminished in comparison to one or more other routers delivering said data packets.

5. The method of claim 1 wherein the response elicited by a diagnostic packet is a returned packet that includes a timestamp.

6. The method of claim 1 wherein each diagnostic packet contains a flag in its header, the value of which is modified by each router it passes through and which elicits a response from a router whenever the received value of the flag reaches a threshold.

7. The method of claim 6 wherein the flag is a TTL flag and each router decrements the value of the flag as a packet passes through the router.

8. The method of claim 6 wherein the elicited response is an error response packet that includes a timestamp.

9. The method of claim 6 wherein the elicited response is an Internet control message protocol (ICMP) time exceeded packet that includes a timestamp and the Internet protocol (IP) address of the router sending the ICMP packet as the source address.

10. The method of claim 1 wherein the data packets are routed on a policy basis and the diagnostic packets include the same policy attributes.

11. The method of claim 10 wherein the policy basis is a quality of service policy.

12. The method of claim 1 wherein the data packets are media packets, video packets, audio packets, real time protocol (RTP) packets send over Internet protocol (IP), Internet protocol (IP) packets, hypertext transfer protocol (HTTP) packets, or any combination thereof.

13. The method of claim 1 wherein the diagnostic packets elicit at least one response from each router along one or more paths between the source and destination.

14. The method of claim 1 further comprising signaling an on-hook condition to close the communications session.

15. The method of claim 1 further comprising transmitting a plurality of diagnostic packets to a router and determining the jitter attributable to the router from timestamps within the elicited packets.

16. The method of claim 1 further comprising determining the delay from timestamps within elicited packets.

17. The method of claim 1 further comprising determining loss from the number of transmitted packets that don't elicit a response.

18. In a packet network communications system, a method of passively analyzing packet-delivery performance during a communications session between a source and destination, the method comprising:

determining from a call signaling exchange that a communications session between a source and a destination has been established, the communications session being that period between a call answer signal from the destination and a call termination condition during which data packets are sent between the source and the destination;

sending in response to determining the establishment of the communications session, diagnostic packets from the source during the established communication session, each diagnostic packet being of the same length as data packets being transmitted in the communications session, each diagnostic packet including: the same user datagram protocol (UDP) destination port number as data packets, the same differential services code point as the data packets, and a real time protocol (RTP) header that is valid for the data being transmitted in the communications session , each diagnostic packet eliciting a response from a router along a path between the source and destination;

analyzing the responses from routers along at least one path to produce a packet-delivery metric for one or more of the routers along one or more paths between the source and the destination; and obtaining information from the destination through out-of-band signaling and using the information to determine the number of routers between the source and destination, the out of band signaling returns the time to live (TTL) value of an RTP packet at the destination, the difference between the TTL value at the destination and the TTL value at the source indicating the number of routers along a path from the source to the destination.

19. An apparatus for passively analyzing packet-delivery performance during a communications session between a source and destination, the apparatus comprising:

a monitor configured to detect by a call signaling exchange the establishment of a communications session between a source and a destination, the communications session being the period between a call answer signal from the destination and a call termination condition during which data packets are sent between the source and the destination;

a diagnostic packet source configured to send in response to having detected the establishment of the communications session, diagnostic packets from the source during the established communication session, each packet eliciting a response from a router along a path between the source and destination; and a controller device configured to analyze the responses from routers along at least one path to produce a packet-delivery metric for one or more of the routers along one or more paths between the source and the destination;

wherein the diagnostic packet source is configured to produce each diagnostic packet in the same format as data packets delivered during the communications session and to produce each diagnostic packet the same length as data packets being transmitted in the communications session, and each diagnostic packet including: the same user datagram protocol (UDP) destination port number as data packets, the same differential services code point as the data packets, and a real time protocol (RTP) header that is valid for the data being transmitted in the communications session.

20. In a packet network communications system, an apparatus for passively analyzing packet-delivery performance during a communications session between a source and destination, the apparatus comprising:

a monitor configured to detect by a call signaling exchange the establishment of a packet communications session between a source and a destination, the packet communications session being that period between a call answer signal from the destination and a call termination condition during which data packets are sent between the source and the destination;

a diagnostic packet source configured to send in response to detecting the establishment of the packet communications session, diagnostic packets from the source during the established packet communication session, each diagnostic packet being of the same length as data packets being transmitted in the communications session, each diagnostic packet including: the same user datagram protocol (UDP) destination port number as data packets, the same differential services code point as the data packets, and a real time protocol (RTP) header that is valid for the data being transmitted in the packet communications session, each diagnostic packet eliciting a response from a router along a path between the source and destination;

a controller device configured to analyze the responses from routers along at least one path to produce a packet-delivery metric for one or more of the routers along one or more paths between the source and the destination; and the controller device also configured to obtain information from the destination through out-of-band signaling and to use the information to determine the number of routers between the source and destination, the difference between the TTL value at the destination and the TTL value at the source indicating the number of routers along a path from the source to the destinationan.

* * * * *